United States Patent [19]

Carlini

[11] Patent Number: 5,794,341
[45] Date of Patent: Aug. 18, 1998

[54] METHOD FOR ASSEMBLING A CONSTANT VELOCITY UNIVERSAL JOINT

[75] Inventor: Sean M. Carlini, Rockford, Ill.

[73] Assignee: Aircraft Gear Corporation, Rockford, Ill.

[21] Appl. No.: 580,225

[22] Filed: Dec. 28, 1995

[51] Int. Cl.$^6$ ........................................... B23P 15/00
[52] U.S. Cl. .................. 29/898.061; 29/263; 29/464; 29/724
[58] Field of Search ................. 29/434, 464, 898.061, 29/898.064, 263, 264, 281.1, 724

[56] References Cited

U.S. PATENT DOCUMENTS

| 4,441,239 | 4/1984 | Mullen | 29/898.061 |
| 4,713,881 | 12/1987 | Lange et al. | 29/724 |
| 5,167,584 | 12/1992 | Krude | 464/145 |
| 5,201,107 | 4/1993 | Mazziotti | 29/434 |
| 5,447,467 | 9/1995 | Baltazar | 451/364 |

Primary Examiner—Larry I. Schwartz
Assistant Examiner—Marc W. Butler
Attorney, Agent, or Firm—Leydig, Voit & Mayer, Ltd.

[57] ABSTRACT

A tool is provided for assembling cross groove constant velocity universal joints. The assembly tool comprises a cup having an open end and a base opposite the open end. The open end has an inwardly tapered rim. The dimension between the base and the rim is established to align tracks of the inner race of the universal joint with the rim. A ball cage is held in position surrounding the inner race, and balls are inserted on the rim, in the cage, and against the inner race so that they are adequately engaged in the inner race for assembly. When all of the balls are positioned in tracks of the inner race, and within the cage, an outer race is brought into position over the rim. The rim is tapered such that a sufficient periphery of the balls is exposed above the rim for engagement with tracks of the outer race. The assemblage is then inverted, allowing the inner race to drop into the outer race, carrying the balls along the tracks and the cage with the balls.

6 Claims, 2 Drawing Sheets

METHOD FOR ASSEMBLING A CONSTANT VELOCITY UNIVERSAL JOINT

FIELD OF THE INVENTION

The present invention generally relates to assembling universal joints, and more particularly to a tool and method for assembling constant velocity universal joints of the type having inner and outer races drivingly connected by balls constrained in a ball cage.

BACKGROUND OF THE INVENTION

Constant velocity joints (CV joints) are a special class of universal joint in which the angular velocity of the output and the input shafts match identically, irrespective of the angle of the joints. As is known, CV joints find significant application in front wheel drive automobiles, and are usually applied two per axle and thus four per vehicle. There are a number of parts which make up a CV joint, and the different parts are subject to differing amounts of wear. At least in part because they are now so widely applied, a rebuilding industry has grown up to refurbish or rebuild worn CV joints.

A typical CV joint includes an inner race having a plurality of circumferentially spaced grooves, an outer race having a matching plurality of circumferentially spaced grooves, a plurality of drive balls (usually six) which ride in the grooves of the inner and outer race and drivingly connect the races, and a ball cage. The ball cage has windows to receive the balls and is carried between the inner and outer races. When the CV joint is flexed, the ball cage assures that the balls remain in a constant velocity plane as they ride in their respective positions in the tracks to drivingly engage the inner and outer races.

As is known in the rebuilding industry, it is very tedious and difficult to properly assemble the parts that make up a CV joint. Of course, during initial fabrication automated machines can assemble these parts. However, these machines are expensive and special purpose and thus generally cost-prohibitive for use in a rebuilding industry. In this regard, the typical environment for rebuilding CV joints may be a mechanic's workstation. Drive axles which are removed from vehicles for rebuilding, are often shipped to a rebuilder in bulk, for example in a crate or pallet load of axles of various different types. The mechanic disassembles those axles, one at a time, and performs the rebuilding operation. It is not an assembly line operation in that he is not operating on numerous items of identical equipment. It should be kept in mind, that there are literally dozens of types of CV joints in common use today, and it is unlikely that a rebuild shop would be able to organize anything like an assembly line operation for the same type of joint.

Thus, to the extent labor can be saved for the mechanic, the labor saving devices must be simple to use, inexpensive, occupy little space, and be moderately adaptable to a relatively large number of joints.

One of the difficulties encountered by the rebuilder is reassembling the joint after the necessary cleaning, refurbishing and replacement. It takes a degree of manual dexterity to manipulate the outer race, the inner race, to get the tracks in the respective races lined up, and to insert the balls in the respective grooves with the cage interposed, all by manual manipulation.

The problem is particularly acute in the cross groove type CV joint. The cross groove joint is designed to allow a limited amount of axial thrusting. That is accommodated by providing either straight or helical tracks in the respective races which are inclined relative to the rotational axis. The drive balls which ride in the respective tracks are positioned in the constant velocity plane by an intersecting groove relationship, and the ball cage, located between the races, maintains the balls in this constant velocity plane. The joint permits axial movement, since the cage is not positionally engaged in either race. Thus, if one race is moved axially away from the other race, the balls assume new positions in the crossed grooves to allow that motion.

The problem with assembling a cross groove joint by hand is that the positions of the driving balls in the respective grooves (when the ball is engaged in both the inner and outer races) is in a given plane whose position is dependent on the relative axial positions of the inner and outer races. Thus, if one is to assemble the joint by hand, it might be necessary to hold the inner and outer races in precise axial relationship with respect to each other, then try to position the balls while holding the cage in place. This can require manipulating six balls, one cage and two races until all are tenuously engaged at the extremity of axial thrust, then having carefully assembled all of those elements, attempting to translate the inner race further into the outer race to complete the assembly operation. That is not an easy task, and can be subject to much frustration.

SUMMARY OF THE INVENTION

In view of the foregoing, it is a primary aim of the present invention to provide an assembly tool for facilitating the ready assembly of constant velocity universal joints, such as those of the cross groove type.

A more specific object of the present invention is to provide an inexpensive assembly tool which may be used by a single technician or mechanic in assembling a constant velocity universal joint.

According to the method aspects of the invention, it is an object to assist a mechanic in assembly cross groove type universal joints by segmenting what had been a complex multiple-manipulation process into a series of relatively simple steps, performable in sequence one at a time, which result in the foolproof assembly of a cross groove CV joint.

Additional objects, advantages and other novel features of the invention will be set forth in the detailed description that follows with reference to the accompanying drawings and will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to an tool for assembling universal joints. The assembly tool principally comprises a cup having an open end surrounded by a rim that is dimensioned to align the races of a universal joint, and is sloped inwardly toward the center of the cup. A base is centrally located in the cup and is disposed below the rim by a distance related to the axial length of the inner race, such that the inner race projects slightly above the lower lip of the rim. In that relationship, the downwardly sloping rim allows balls to be placed on the rim and engaged in the tracks in the inner race, with the projection of the inner race above the rim allowing at least half of the ball to engage the associated track. The balls are positioned on the rim in the tracks one at a time, with the ball cage being interposed, such that the balls suspend the cage above the cup. The angle of the rim is selected to project an adequate dimension of the ball above the rim to engage an outer race, when the outer race is positioned, inverted style, over the rim. Thus, after all the balls are inserted in the cage and positioned in their respective tracks, the outer race is positioned over the rim. In that position, the balls are in driving engagement with the respective tracks, at about the outer extremity of axial thrust of the joint. However, the balls are reliably engaged in both sets of tracks. Inversion of the cup then allows the inner race to drop into the outer race. However, because the balls are engaged, the balls ride in the respective tracks as the inner race drops into the outer race, carrying the cage with it, resulting in an assembled CV joint.

In accordance with one aspect of the present invention, the tool described above facilitates a method for assembling a universal joint. According to the method of the present invention, the cup is positioned with its open end facing up, and an inner race of the universal joint is centered on a cup base. In this position, the second or opposing end of the inner race projects slightly above the rim of the cup. A ball cage of the universal joint is held about the end of the inner race and balls are manually positioned on the rim, in the cage slots and in the tracks of the inner race. In this regard, the inwardly tapered rim serves to hold the balls against the inner race and in their tracks. Thereafter, an outer race of the universal joint is aligned with the rim of the cylinder, and the outer race is positioned substantially flush therewith so that the exposed tops of the balls seat in their tracks in the outer race. Then, holding the cylinder and the outer race firmly together, the entire assembly is inverted, so that the open end of the cylinder is now substantially downwardly directed. The inner race falls into the outer race, with the balls being engaged in respective tracks riding into their tracks as the races are engaged, and carrying the ball cage along. The result in a reliably assembled CV joint.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Figure 1:
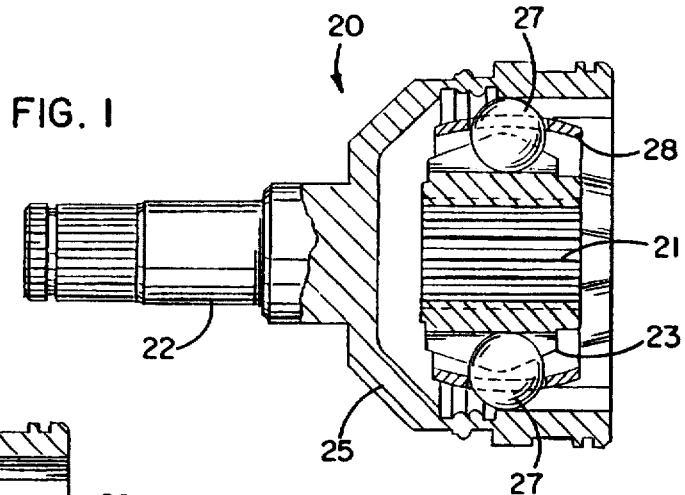
FIG. 1 is a fragmentary side view of a typical cross groove constant velocity universal joint.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Figure 2:
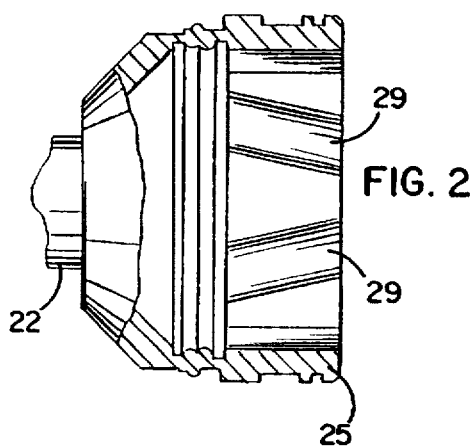
FIG. 2 is a fragmentary view, similar to FIG. 1 but with the inner race, balls and ball cage removed, better showing the inclined tracks of the cross groove joint.

Referring now to the drawings, FIG. 1 shows a fragmentary side view of a cross groove constant velocity universal joint. FIG. 2 better illustrates the nature of the tracks in a cross groove joint. Since the present invention relates to a tool for assembling the component parts of a CV joint and since the structure and operation of CV joints are well known, the CV joint shown in FIG. 1 will not be described in extensive detail herein. Rather, it is understood that persons of ordinary skill in the art will appreciate the structure and operation of CV joints, or otherwise well-known references may be accessed to provide this general information.

FIGS. 1 and 2 illustrate a conventional cross groove constant velocity joint 20. The joint has a pair of input and output shafts, a shaft 22, typically an input shaft is shown in FIG. 1. A second shaft is splined and fits within a splined aperture 21 in an inner race 23.

A characteristic of the CV joint is that the angular velocity of the output shaft always matches the angular velocity of the input shaft, no matter what the angle formed by the universal joint. That is achieved by using driving balls and keeping the driving balls in a constant velocity plane which establishes the very special geometry of such a joint. In a cross groove joint, the relationship of the races, their respective grooves and the drive balls also allows for a limited amount of axial translation of the inner race with respect to the outer race. That is used on drive shafts which require some limited degree of thrusting capability, where one of the shafts can actually move inwardly or outwardly with respect to the other shaft.

Turning to the cross groove cv joint in greater detail, it will be seen that the joint includes an outer race 25 and an inner race 23. The races are drivably connected through a plurality of drive balls 27. Typically six drive balls are utilized. The geometry of the joint defines a constant velocity plane for any angular relationship between the input and output shafts. A ball cage 28 is provided which has windows for receiving the drive balls and maintaining the balls in the constant velocity plane. The windows are elongate in the circumferential direction. It will be appreciated from FIG. 2 that the cross groove joint has a plurality of tracks 29 in which the balls ride, and the tracks are circumferentially spaced and inclined relative to the rotational axis of the race. Typically the tracks are straight as shown in FIG. 2, although helical tracks can be used. In both cases, however, they are alternately inclined relative to the rotational axis. As such, any axial position of the inner race with respect to the outer race establishes a relationship between the drive balls, defining their circumferential pattern about the circumference of the race. As the joint is flexed, the circumferential pattern again changes. The ball cage assures that the balls stay in the constant velocity plane as they impart torque from the input to the output shaft.

It will be appreciated upon an inspection of FIGS. 1 and 2 that assembly of the elements which make up a constant velocity joint is not a straightforward matter. There is an axial position between the two races, which is the "just-assembled" position in which the balls are engaged in the ends of the tracks of the inner race, and assume a circumferential pattern which matches the circumferential pattern of the tracks of the outer race, so that when the two are juxtaposed, the inner race will thereupon move axially into the outer race, carrying the balls along the tracks and the cage with the balls. That just-assembled position can be considered substantially the position in which about half the diameter of the ball is in the tracks of the inner race and the other half diameter is engaged in tracks in the outer race. It is that condition which must be found in order to assemble the pieces. That is rather difficult from a straight manual manipulation point of view, since it is necessary to manipulate or fix the outer race, to hold or manipulate the inner race, to somehow support the cage, to get them axially and angularly aligned so that the tracks will be juxtaposed and accept balls, then to insert the six balls, one at a time, all while not dropping any of the pieces, until everything is assembled and the inner race actually translated into the outer race.

In accordance with the invention, a special tool is provided for assisting in the assembly. As will be apparent, the special tool allows the manual manipulation of the inner race, the cage and the balls to preassemble those elements in the just-assembled position and present them, ready for engagement with the outer race. The outer race is then juxtaposed to the preassembled inner race components, and when the balls are partly engaged in the tracks of the inner race and partly engaged in the tracks of the outer race, the assembly is inverted, allowing the inner race to translate by gravity into the outer race, carrying the balls along the tracks and the cage with the balls.

Figure 3:
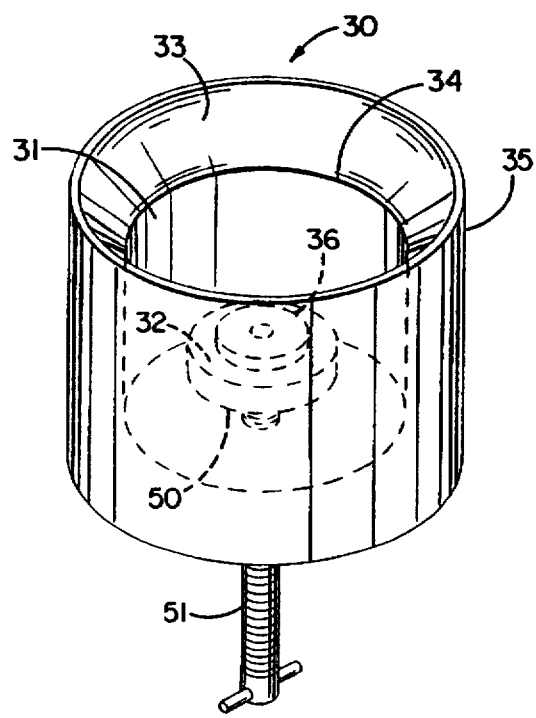
FIG. 3 is a perspective view of an assembly tool exemplifying the present invention.
Figure 4:
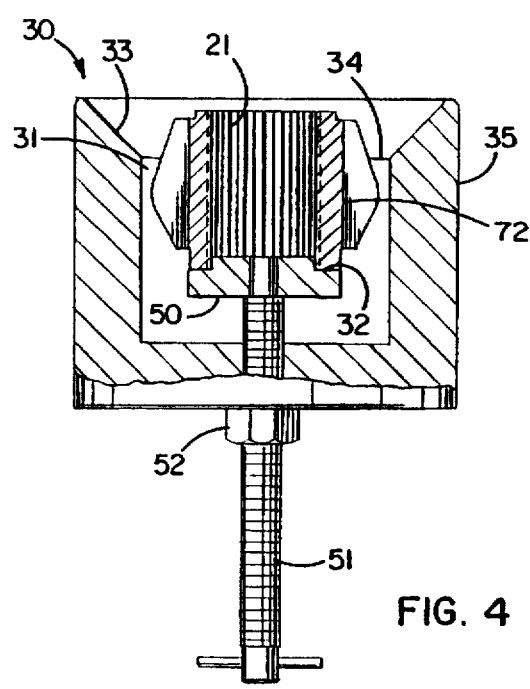
FIG. 4 is a fragmentary side view of the assembly tool of FIG. 2 containing the inner race of a constant velocity universal joint.

The manner in which that is accomplished will now be described. Referring first to FIGS. 3 and 4, it will be seen that an assembly tool 30 is provided which is in the form of a cylindrical cup 31 having a base 32 with a centering mechanism 36 for supporting an inner race, and having a tapered rim 33 in a predetermined relationship with respect to the base. The rim 33 is not perpendicular with respect to its upstanding side walls 34, 35, but instead is angled downwardly toward the center of the cup 31. The degree of taper will be further described below, but suffice it to note for the moment, that the taper of the rim 33 causes the balls, when placed on the rim, to move inwardly. When an inner race 23 is positioned on the base 32 as is shown in FIG. 4, the tapered rim 33 will thereupon cause the drive ball to rest against the inner race. If the ball is positioned so that it engages a groove, it will remain in that position, seated in the groove and supported on the rim. In practicing the invention, the dimensions of the cup are established to have the inner race 23 projecting above the lower point of the tapered rim 33, so that when a ball is seated on the tapered rim 33, it positively engages a groove 72 in the inner race. That positive engagement is typically considered to be at least about half the diameter of the ball. Thus, the depth of the cup, i.e., the distance between the base 32 and a reference point on the tapered rim 33 is established so that the ball will thus-engage the tracks of the inner race when seated on the rim. The inner diameter of the cup is selected so that it is just larger than the outer diameter of the ball cage 28, so that the cage 28 will just fit within the cup.

The degree of taper of the rim 33 is also significant. The degree of taper determines the amount of ball and cage which will project above the rim when the balls are seated against the track in the cup. As will become more apparent, the degree of taper is established so that a sufficient upper portion of the ball is available for presentation to an outer race, so that an outer race positioned over the rim 33 will be capable of having its tracks engage the respective balls.

Figure 7:
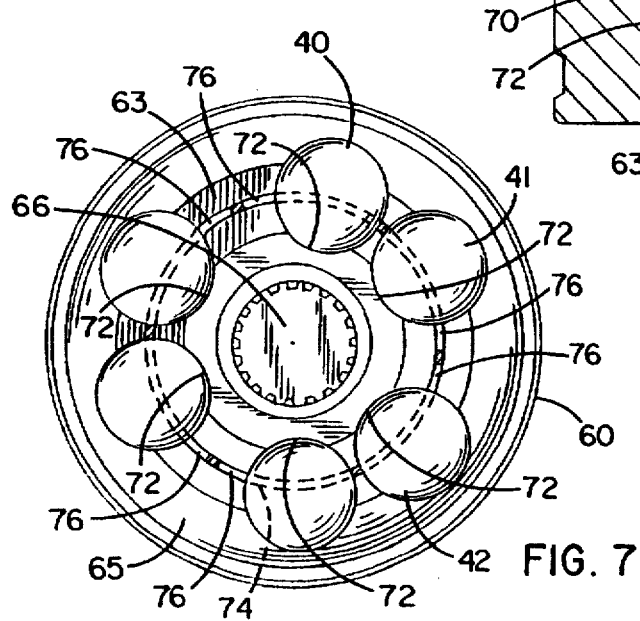
FIG. 7 is a sectional view taken generally along the line 7—7 of FIG. 6 and showing the pattern of the balls in the grooves and in the cages at the "just-assembled" position.

As noted above, the distance between the base 32 and on the rim 33 is significant in achieving the configuration needed to allow the assembly tool to function. It is necessary to support the balls against the inner race so that the balls are in the just-assembled position, and are therefore in a circumferential orientation which will match the pattern of the outer race at its entrance point. Referring briefly to FIG. 7, there is shown the circumferential pattern of the balls when they are seated in the just-assembled position. It will be seen that the balls are not equidistantly spaced around the circumference, but are arranged in pairs, with larger gaps between the pairs. This is due to the cross joint configuration, where the tracks are arranged at an angle with respect to the rotational axis, and thus the balls when traveling in the tracks, do not move along axial lines, but instead move along the angularly inclined tracks. Thus, taking the pair of balls 40, 41 in FIG. 7, as the balls move downwardly along the track, the distance between them will increase. However, by way of contrast, the ball 41 will be moving closer circumferentially to the ball 42 as the balls progress down their respective tracks.

It is necessary to achieve the appropriate circumferential spacing, so that the balls are held in the just-assembled position in the inner race, so that placing the outer race in position allows the balls to also enter the tracks of the outer race. From that position, the joint can be assembled. It will now be apparent that the height of the cup, that is the distance between the base 32 and the rim 33 is important in achieving that relationship. If the height is insufficient, the balls will progress further down the track, and the balls 40, 41, for example, will be more deeply engaged in the inner race, will be further separated with respect to each other, so they will not match the associated tracks in the outer race when it is juxtaposed. However, presenting the balls so that they are only about half engaged in the tracks of the inner race will assure that the balls are in the pattern of FIG. 7, and thus will be configured to match the pattern in the tracks in the outer race.

The assembly tool shown in FIGS. 3 and 4 is configured to allow experimentation to determine the appropriate distance between the base 32 and the rim 33. It will be seen that the base 32 is a separate cylindrical member 50 supported on an adjusting screw 51 having a lock nut 52 engaging the under surface of the cup 31. The cup is preferably an aluminum casting having a hole drilled and tapped in its center. Thus, with the lock nut 52 loosened, it is possible to rotate the screw 51 to raise or lower the base 32 with respect to the rim 33. When it is in the appropriate position, the lock nut 52 is tightened.

Figure 5:
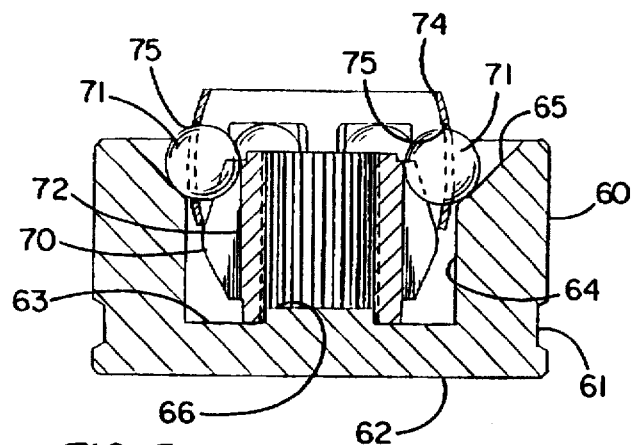
FIG. 5 is a view similar to FIG. 4 showing a preferred embodiment of an assembly tool in accordance with the present invention, with an inner race inserted as in FIG. 3, and with a ball cage and balls also in position.
Figure 6:
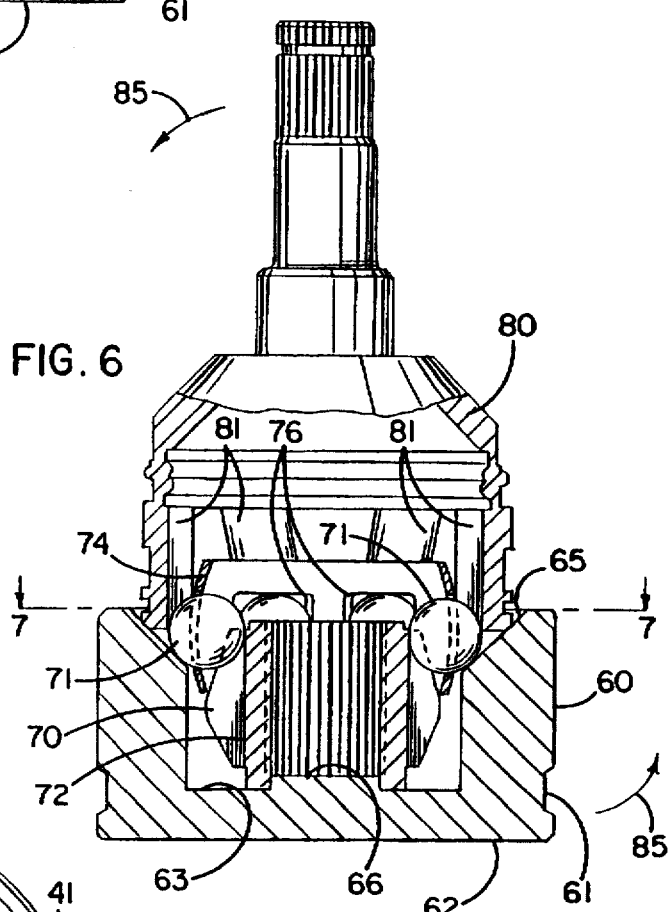
FIG. 6 is a view similar to FIG. 5 additionally showing the housing of a constant velocity universal joint overlying the assembly tool.

While the embodiment of FIGS. 3 and 4 is useful in establishing the appropriate dimension between the base and the rim, and is also useful in providing a tool which can work with a number of different universal joints, it is currently preferred to provide specialized tools adapted to particular joints or sets of joints. The assembly tool 60 of FIGS. 5 and 6 is preferably a molded cup of thermoplastic material, preferably polypropylene. The cup is dimensioned to fit one or more types of cross groove CV joints. It is currently seen that approximately three such tools will be needed to service an array of commonly available cross groove joints. The tool 60 is much lighter than that of the earlier embodiment, and much more inexpensive. It has an external cup shape, and a set of finger grips 61 adapted for gripping in the hand. A flat supporting base 62 allows the tool 60 to be positioned on the workbench. In that position, an internal base 63 of a cup 64 is available to receive an inner race 70 of a CV joint. A sloped rim 65 slopes toward the center of the cup and a centering boss 66 is provided for centering an inner race in the cup. In that position one or more balls 71 of a CV joint are guided down the inclined rim 65 into engagement with tracks 72 in the inner race 70.

In practice, the balls are positioned one at a time. The operator first places the inner race over the centering boss 66 in the cup. While holding the ball cage 74 in approximate position, a first ball 71 is dropped into place. The upper edge 75 of the cage 74 is thereupon supported on the ball 71. A second ball 72 is then put into place opposite the first, and the cage is now held suspended. The remaining balls, typically four additional balls, are slid into their respective windows in the cage usually by tipping the cage to allow entry of the ball, until all drive balls are seated in their respective tracks. Referring briefly to FIG. 7, it will be seen that the balls in their just-engaged position with the lower track, are not equi-angularly spaced around the race, but are located by virtue of the tracks 72 in positions defined by the upper extremities of the track. FIG. 7 shows that the windows 76 in the ball cage extend circumferentially to allow the balls to move circumferentially with respect to each other, as guided by the intersecting tracks. Referring again to FIG. 5, it will be seen that about the lower half of the ball is engaged in the track while the upper half is exposed. By virtue of the angle of the rim 65, however, at the outside of the ball, even a greater portion of the periphery is available for receiving the outer race.

When the tool 60 is loaded with an inner race, a cage and a full set of balls as illustrated in FIG. 5, with the balls positioned in the just-engaged position in the inner race, and supporting the ball cage 74, the tool is then prepared to receive the outer race. An outer race 80 is shown in position in FIG. 6. It will be seen that the angle 65 of the rim is such as to allow the outer race 80 to be positioned over the balls, such that the balls engage tracks 81 in the just-assembled position. The angular relationship of the two rearmost tracks will be apparent in FIG. 6. By virtue of the angle of the bevel 65, the outer race is allowed to advance over the balls until about half the ball is engaged in the tracks of the outer race. In the condition thus illustrated in FIG. 6, the CV joint is in the just-assembled position in which the balls are securely (although tenuously) seated in the tracks of both the inner and outer races. If they are separated any farther, the CV joint will obviously be disassembled. However, the position illustrated in FIG. 6 is the position needed for the beginning of assembly, termed herein the just-engaged or just-assembled position.

With the assembly thus configured as in FIG. 6, as indicated by the arrows 85, the entire assemblage is inverted. Gravity causes the inner race to drop downward. The tracks 81, 72 being engaged with the balls 71, cause the balls to travel along the tracks, and the balls being engaged with the ball cage 74 carry the ball cage along. Thus, the inner race drops within the outer race, while the balls ride along the tracks to their further-engaged position, carrying the ball cage along. The race is thus fully assembled, and the tool 60 can be removed. A splined shaft can be inserted into the inner race, the joint lubricated, boots put in place, etc., but the mechanical elements of the U-joint are assembled at that point.

In addition to adjusting the depth of the cup, i.e., the distance between the base and a reference point on the beveled edge, another factor which requires adjustment in connection with some CV joints is the angle of the bevel. In most cases, it is preferred to use a bevel of about 45°, which is found to adequately position the balls in the just-engaged position, and allow sufficient space for positioning of the outer race. However, in some cases, flanges in the outer race require additional height to be presented by the balls with suspended cage before the outer race is assembled to those elements. In those cases, it is preferred to reduce the angle of the bevel to about 30°, presenting a flatter surface, and holding the balls and cages up higher above the edge of the rim to allow the outer race to be positioned over those elements.

It will thus be appreciated that what has been provided is a tool which allows the simple and sequential assembly of multiple elements which make up a constant velocity cross groove type joint. An inner race is first positioned in a cup. While a ball cage is held in position, the balls are inserted one at a time. The cup is dimensioned to cause the balls to enter the just-engaged position with respect to the inner race. When all the balls are inserted, the balls suspend the ball cage and are all seated in their respective grooves in the inner race in the just-engaged position. The angle of the beveled surface of the tool then allows the positioning of an outer race to also assume the just-engaged position. The total assemblage is thereupon inverted, and the inner race translates into the outer race carrying the balls and cage as guided along their respective tracks.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of assembling a constant velocity cross groove universal joint, the joint requiring assembly of an outer race, an inner race drivably connected through drive balls located in circumferentially spaced tracks of the races alternately inclined relative to a rotational axis, the balls being maintained in a constant velocity plane by a ball cage disposed between the races, the method comprising the steps of positioning the inner race in a cup of an assembly tool with an adequate axial length of the tracks thereof projecting above a tapered rim of the cup for engagement with a set of drive balls, manually supporting a ball cage in approximate position surrounding the inner race, inserting the drive balls into windows in the cage and on the rim so that the taper engages the balls with tracks in the inner race, thereby to support the ball cage with the balls, the ball cage and balls partly projecting above the rim of the cup, positioning an outer race on the rim of the cup with the tracks of the outer race engaging the projecting portions of the balls to locate the balls in driving engagement with both the inner and outer races, and inverting the cup to allow the inner race to drop into the outer race, carrying the balls along the tracks and the cage with the balls.

2. The method according to claim 1 wherein the step of positioning the inner race in the cup includes locating the inner race over a centering mechanism in the cup with a portion of the tracks of the inner race projecting into the area of the rim of the cup.

3. The method according to claim 1 wherein the step of sequentially inserting the drive balls engages approximately the lower half of the balls with the tracks of the inner race in a just-assembled position for the inner race.

4. The method according to claim 3 in which the step of sequentially inserting the drive balls exposes approximately the upper half of the drive ball for engagement with the tracks of the outer race when the outer race is positioned over the rim so that the outer race is also in the just-assembled position.

5. The method according to claim 1 wherein the step of sequentially inserting the drive balls inserts a first drive ball which partly supports the ball cage at one point of the periphery thereof, and the insertion of a second drive ball at a diametrically opposed point fully supports the ball cage.

6. The method according to claim 5 in which the step of sequentially inserting the drive balls includes inserting subsequent drive balls while manually tipping the cage to allow the drive balls to enter cage windows to assume a just-assembled position.

* * * * *